United States Patent
An

(10) Patent No.: US 8,590,923 B2
(45) Date of Patent: Nov. 26, 2013

(54) DOOR HINGE STRUCTURE FOR PASSENGER AIRBAGS

(75) Inventor: Jae Hyun An, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 42 days.

(21) Appl. No.: 13/167,358

(22) Filed: Jun. 23, 2011

(65) Prior Publication Data

US 2012/0104732 A1    May 3, 2012

(30) Foreign Application Priority Data

Oct. 29, 2010    (KR) .................. 10-2010-0107299

(51) Int. Cl.
*B60R 21/205*    (2011.01)
*B60R 21/215*    (2011.01)

(52) U.S. Cl.
USPC ....................... 280/728.3; 280/732

(58) Field of Classification Search
USPC ............................. 280/728.3, 732
See application file for complete search history.

(56) References Cited

U.S. PATENT DOCUMENTS

| | | | |
|---|---|---|---|
| 4,852,907 A * | 8/1989 | Shiraki et al. ................ | 280/731 |
| 5,035,444 A * | 7/1991 | Carter ........................... | 280/732 |
| 5,335,939 A * | 8/1994 | Kuriyama et al. ........... | 280/728.3 |
| 5,393,089 A * | 2/1995 | Pakulsky et al. ............ | 280/728.3 |
| 5,427,408 A * | 6/1995 | Ando et al. .................. | 280/728.3 |
| 5,437,470 A * | 8/1995 | Terai et al. ................... | 280/728.3 |
| 5,456,490 A * | 10/1995 | Carter et al. ................ | 280/728.3 |
| 5,498,027 A * | 3/1996 | Kelley et al. ................ | 280/728.3 |
| 5,639,115 A * | 6/1997 | Kelley et al. ................ | 280/728.3 |
| 5,975,562 A * | 11/1999 | Yamamoto et al. ......... | 280/728.3 |
| 7,178,825 B2 * | 2/2007 | Fujii et al. ................... | 280/728.3 |
| 7,210,700 B2 * | 5/2007 | Zagrodnick .................. | 280/728.3 |
| 2005/0269804 A1* | 12/2005 | Yamada et al. .............. | 280/728.3 |

FOREIGN PATENT DOCUMENTS

| | | |
|---|---|---|
| JP | 2005-178595 A | 7/2005 |
| KR | 10-0633138 B1 | 10/2006 |

* cited by examiner

*Primary Examiner* — Paul N Dickson
*Assistant Examiner* — Laura Freedman
(74) *Attorney, Agent, or Firm* — Morgan, Lewis & Bockius LLP

(57) ABSTRACT

A door hinge structure for passenger airbags, may include an airbag module installed inside a crash pad at a location spaced apart from the crash pad, and an airbag door having a hinge unit provided on an inner surface of the crash pad at a location facing the airbag module, wherein the airbag door may be provided with a reinforcing bracket, the reinforcing bracket being embedded in the airbag door at an area around the hinge unit, on which a stress may be concentrated when an airbag cushion deploys from the airbag module, thus increasing a strength of the airbag door.

4 Claims, 4 Drawing Sheets

DOOR HINGE STRUCTURE FOR PASSENGER AIRBAGS

CROSS-REFERENCE TO RELATED APPLICATIONS

The present application claims priority to Korean Patent Application No. 10-2010-0107299 filed on Oct. 29, 2010, the entire contents of which is incorporated herein for purposes by this reference.

BACKGROUND OF THE INVENTION

1. Field of the Invention

The present invention relates, in general, to door hinge structures for passenger airbags and, more particularly, to a door hinge structure for passenger airbags, which can normally execute a designated behavior of the airbag without breaking when an airbag door opens, when airbag cushions of various kinds of airbag modules having different explosive pressures expand.

2. Description of Related Art

Generally, a front passenger airbag of a car includes an airbag module installed in a crash pad and, and when a car collision occurs, an airbag door opens and an airbag cushion expands to protect a passenger from impact stemming from the collision.

An invisible airbag door provided in a crash pad is integrated with the crash pad into a single structure for improving the appearance of the crash pad. Therefore, a door line of the invisible airbag door is not visible from the outside, but a skin cut part is formed in the inner surface of a skin layer at a predetermined location such that it allows a panel of the crash pad to be easily opened when the airbag door opens.

In the invisible airbag door, an airbag door line is formed in the crash pad by forming a thin and weak part in the crash pad in such a way that, when an airbag cushion expands, the airbag door can open along the thin airbag door line and the airbag cushion can expand through the open airbag door. In the related art, the airbag door line of the invisible airbag door was formed by injection-molding the crash pad in such a way that some of the crash pad becomes thinner along a designated airbag cushion expanding line or is formed by forming a micro-groove along the designated airbag cushion expanding line using a laser beam after the crash pad has been injection-molded.

FIG. 1 is a sectional view illustrating a conventional door hinge structure for a passenger airbag. As shown in FIG. 1, a crash pad 1 is provided in front of a front passenger seat inside a passenger compartment and an airbag module 2 is installed inside the crash pad 1 at a location spaced apart from the crash pad 1 by a predetermined distance.

The airbag module 2 is configured such that an airbag cushion can expand in response to an impact generated by a car collision. As shown in FIG. 1, an airbag door 10 having a hinge unit 11 is provided in the inner surface of the crash pad 1 at a location facing the airbag module 2.

In a typical airbag, the airbag door is welded to the inner surface of the crash pad while an edge of the airbag door opposed to the hinge unit is cut so that, when the airbag cushion expands, the airbag door is pushed and rotated outwards around the hinge unit, thus opening.

However, the airbag door 10 having the structure shown in FIG. 1 is integrated with the crash pad 1 into a single structure using a single material and is typically used with a low explosive pressure airbag, such as the depowered airbag typically used in Korea or Europe. Thus, the airbag door 10 having the structure shown in FIG. 1 is problematic in that, when the airbag door 10 is used with a high explosive pressure airbag, such as an advanced airbag typically used in North America, the airbag door 10 may fail to behave normally as designated, but may break the hinge unit when the airbag cushion expands.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to propose a door hinge structure for passenger airbags, in which a reinforcing bracket is installed in an airbag door and allows the airbag door to be normally open without being broken when an airbag cushion expands, so that the airbag door can be used with various kinds of airbags having different explosive pressures.

In order to achieve the above object, according to one aspect of the present invention, the door hinge structure for passenger airbags may include an airbag module installed inside a crash pad at a location spaced apart from the crash pad, and an airbag door having a hinge unit provided on an inner surface of the crash pad at a location facing the airbag module, wherein the airbag door may be provided with a reinforcing bracket, the reinforcing bracket being embedded in the airbag door at an area around the hinge unit, on which a stress may be concentrated when an airbag cushion deploys from the airbag module, thus increasing a strength of the airbag door.

The reinforcing bracket may include base parts arranged in opposite sides of the hinge unit with respect to a longitudinal axis of the hinge unit and connected to the airbag door, and a connection part connecting each base part and arranged along a bent part of the hinge unit.

The connection part and the base parts may have an H-shaped structure.

The reinforcing bracket may include base parts arranged in opposite sides of the hinge unit with respect to a longitudinal axis of the hinge unit and connected to the airbag door, side connection parts connecting base parts each other at opposite distal ends of the base parts and arranged along a bent part of the hinge unit, and at least a center connection part connecting each base part between the side connection parts and arranged along the bent part of the hinge unit, wherein the side connection parts may be exposed outside of the hinge part in a direction towards the airbag module in a way such that the stress generated when the airbag cushion deploys directly acts on the side connection parts.

The side connection parts protrude more towards the airbag module than the at least a center connection part from the hinge part such that, when the airbag cushion deploys, the stress can act on the side connection parts before the stress acts on the at least a central connection part.

At least a support piece protrudes from a rear surface of each of the side connection parts facing the airbag module, and wherein a rear part of the reinforcing bracket and the at least a support piece may be embedded in the airbag door so as to prevent the rear part of the reinforcing bracket from being rotated when the airbag cushion deploys, wherein the at least a support piece may include a through hole and a material of the airbag door may be supplied into the through holes.

The reinforcing bracket may be made up of a material harder than that of the airbag door.

As described above, the present invention is advantageous in that, even when a very high stress acts on the airbag door in the case of the airbag instantaneously creating explosive pressure when the airbag cushion expands, the airbag door can be normally opened without being broken by the reinforcing bracket installed in the airbag door, so that the airbag door can be compatibly used with a depowered airbag typically used in Korea and Europe and with an advanced airbag typically used in North America.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
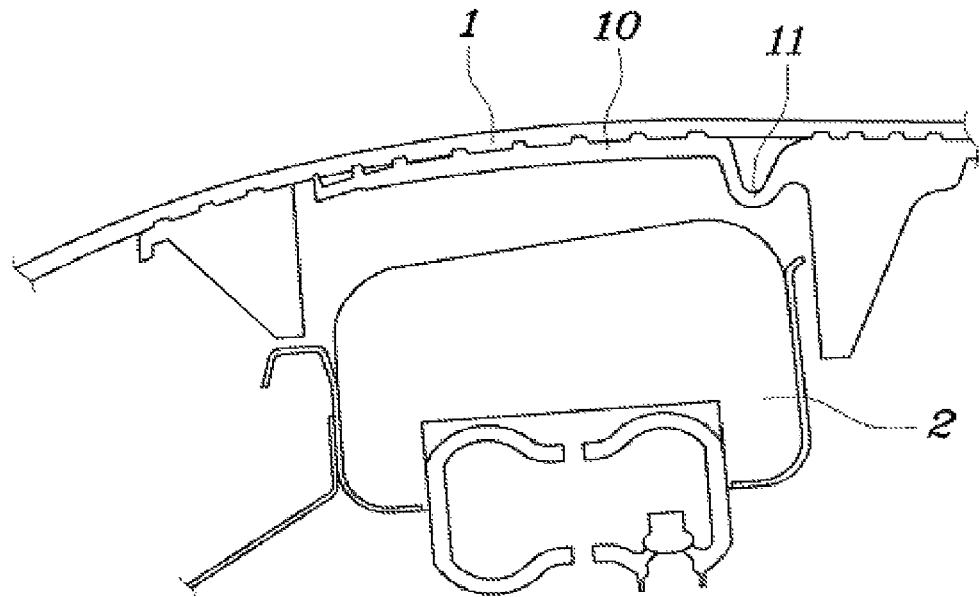
FIG. 1 is a sectional view illustrating a conventional door hinge structure for passenger airbags.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to an exemplary embodiment of the invention with reference to the accompanying drawings.

Figure 2:
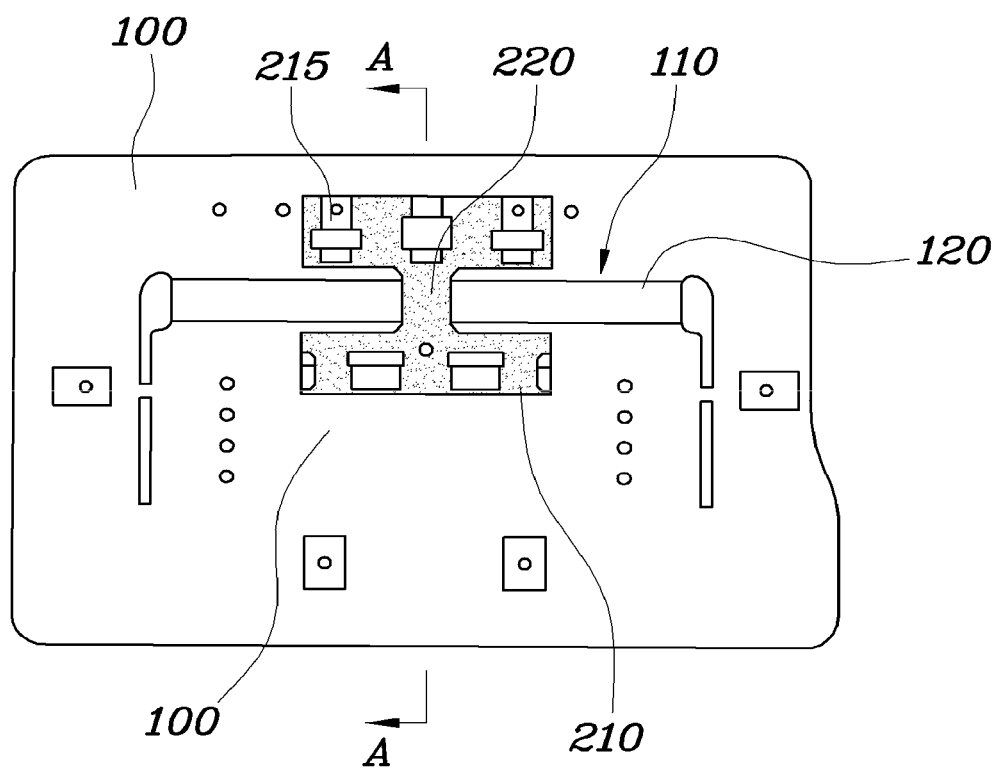
FIG. 2 is a plan view illustrating a door hinge structure for passenger airbags according to various exemplary embodiments of the present invention.
Figure 3:
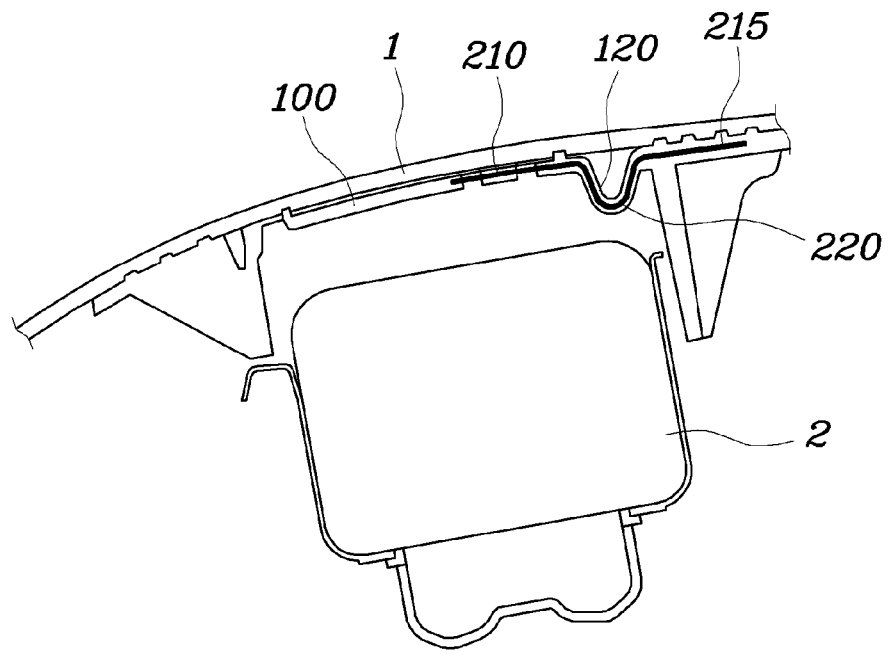
FIG. 3 is a sectional view taken along line A-A of FIG. 2.

As shown in FIGS. 2 and 3, in the structure of the present invention, a crash pad 1 is provided in front of a front passenger seat inside a passenger compartment and an airbag module 2 is installed inside the crash pad 1 at a location spaced apart from the crash pad 1 by a predetermined distance.

The airbag module 2 is configured such that an airbag cushion can expand in response to a car collision impact. An airbag door 100 having a hinge unit 110 is provided in the inner surface of the crash pad 1 at a location facing the airbag module 2.

The airbag door 100 is welded to the inner surface of the crash pad 1 while an edge of the airbag door opposed to the hinge unit 110 is cut so that, when the airbag cushion expands, the airbag door 100 is pushed and rotated outwards around the hinge unit 110 by the explosive pressure of the airbag cushion, thereby opening.

In the airbag door 100, a reinforcing bracket 200 is installed at a predetermined location around the hinge unit 110, on which a stress is concentrated when the airbag cushion expands, thus increasing the structural strength of the hinge unit 110. The shape and construction of the reinforcing bracket 200 according to the first embodiment of the present invention is shown in FIG. 2.

To more efficiently illustrate the shape and construction of both the airbag door 100 and the reinforcing bracket 200 according to an exemplary embodiment of the present invention, the crash pad 1 arranged outside the airbag door 100 was removed from FIG. 2.

When the airbag door 100 is used with an advanced airbag having high explosive pressure, stress generated from the high explosive pressure of the airbag is typically concentrated on the hinge unit 110 of the airbag door 100. When there is no reinforcing bracket 200 installed in the airbag door 100 which is being opened outwards, the airbag door 100 may behave abnormally because the hinge unit 110 was broken by the concentrated stress.

However, when the reinforcing bracket 200 is installed in the hinge unit 110 of the airbag door 100 according to an exemplary embodiment of the present invention, the reinforcing bracket 200 can efficiently resist the stress acting in the hinge unit 110, thereby preventing the hinge unit 110 from breaking and realizing normal behavior of the airbag door 100.

In the first embodiment of the present invention shown in FIGS. 2 and 3, the reinforcing bracket 200 includes base parts 210 and 215 arranged in opposite sides of the hinge unit 110 such that the base parts correspond to each other, and a connection part 220 connecting the two base parts 210 and 215 to each other and arranged along a bent part 120 of the hinge unit 110.

Here, the connection part 220 may be configured to connect the entire edges of the two base parts 210 and 215 to each other. However, it is preferred that the connection part 220 be configured to have an H-shaped structure formed between the two base parts 210 and 215, as shown in the drawings.

Figure 4:
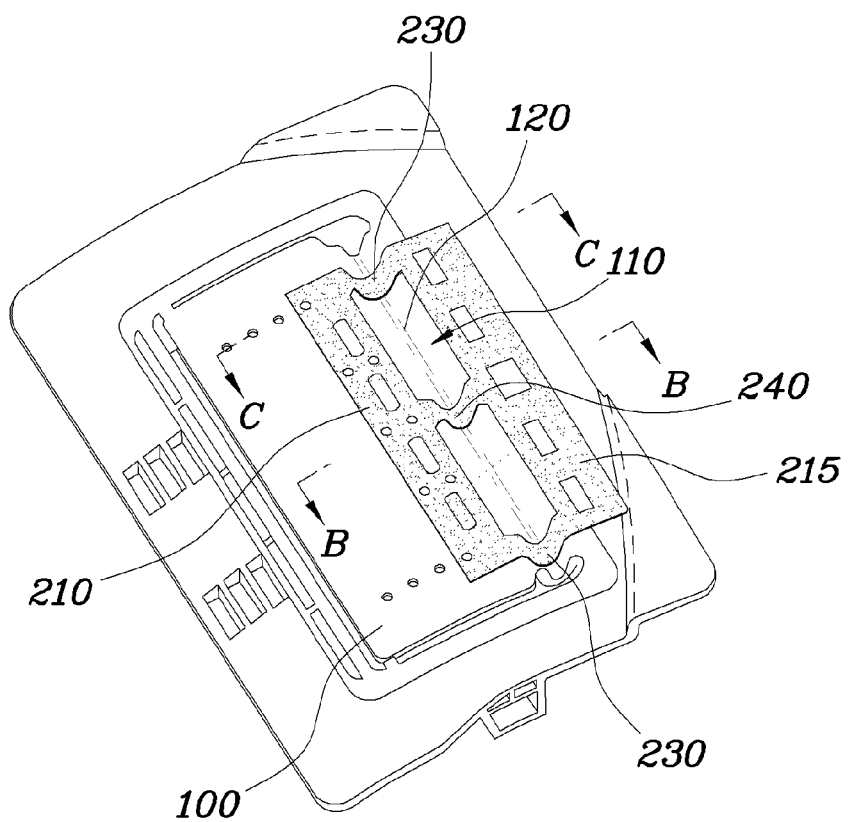
FIG. 4 is a plan view illustrating a door hinge structure for passenger airbags according to various exemplary embodiments of the present invention.
Figure 5A:
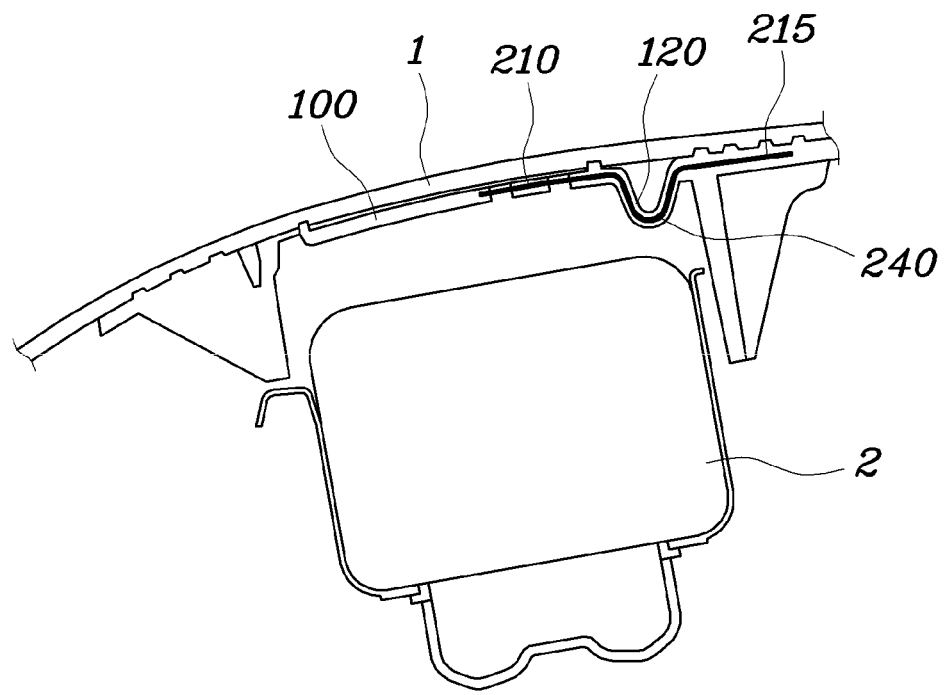
FIG. 5A and FIG. 5B are sectional views taken along lines B-B and C-C of FIG. 4, respectively.
Figure 5B:
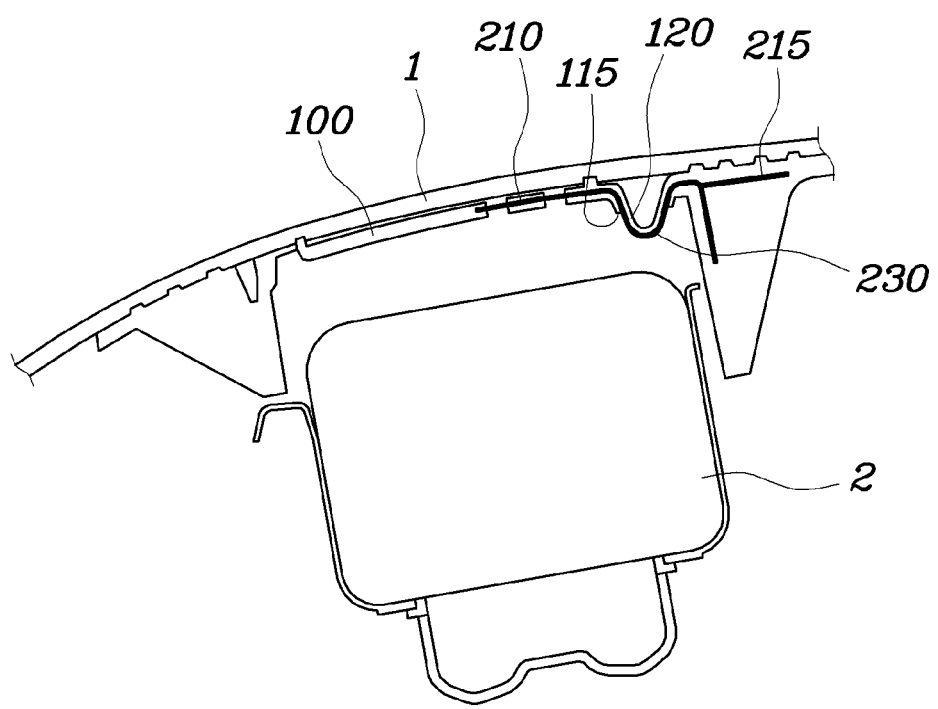
Figure 6:
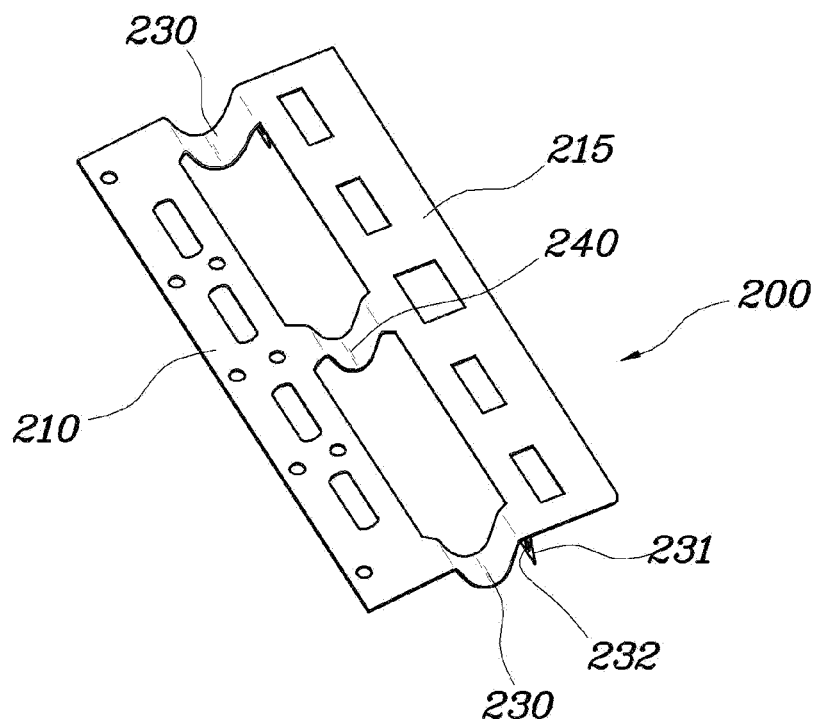
FIG. 6 is a perspective view illustrating a reinforcing bracket according to the various exemplary embodiments of the present invention.
Figure 7:
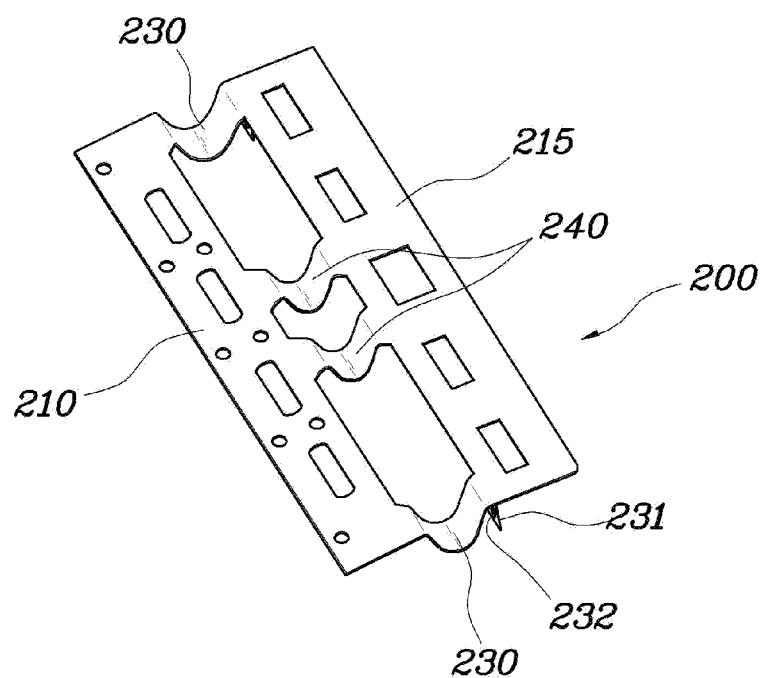
FIG. 7 is a perspective view illustrating a reinforcing bracket according to a modification of the various exemplary embodiments of the present invention.

Further, as shown in FIGS. 4, 5A and 5B, the reinforcing bracket 200 according to the second embodiment of the present invention includes base parts 210 and 215, which are arranged in opposite sides of the hinge unit 110, side connection parts 230 connecting the two base parts 210 and 215 to each other at opposite side ends of the two base parts 210 and 215 and arranged along the bent part 120 of the hinge unit 110, and at least one center connection part 240 connecting the two base parts 210 and 215 to each other at central portions of the two base parts 210 and 215 and arranged along the bent part 120 of the hinge unit 110. Here, the center connection part 240 may be one center connection part as shown in FIG. 6 or may be two center connection parts as shown in FIG. 7. Described in brief, the reinforcing bracket 200 according to the second embodiment may be provided with at least one center connection part 240 without limiting the number of the center connection parts 240 to that shown in the drawings.

Therefore, in the reinforcing bracket 200 according to the second embodiment of the present invention, the two base parts 210 and 215 are connected to each other both by two side connection parts 230 and by one center connection part 240.

Here, the center connection part 240 is embedded in the hinge unit 110 of the airbag door 100 as shown in FIG. 5A. The embedment of the center connection part 240 in the hinge unit 110 of the airbag door 100 can maintain the flexibility of the hinge unit 110 made of synthetic resin when the airbag cushion expands. Further, in an exemplary embodiment of the present invention, the side connection parts 230 may be exposed outside in a direction towards the airbag module 2, as shown in FIG. 5B, in such a way that the stress generated from the explosive pressure of the airbag can directly act on the exposed reinforcing bracket 200.

The exposure of the side connection parts 230 to the outside of the hinge unit 110 is realized due to the following reason. Most of the explosive pressure of the airbag is typically and directly applied to a portion around the side connection parts 230 so that, when the side connection parts 230 are entirely embedded in the hinge unit 110 of the airbag door 100, the explosive pressure of the airbag will be primarily applied to the hinge unit 110 made of synthetic resin and thereby the hinge unit 110 may start to fracture.

Once the hinge unit 110 starts to fracture as described above, the fracture may easily propagate to the area around an original fracture point. Thus, in order to prevent such a propagation of the fracture, it is preferred that the side connection parts 230 made of steel be configured to directly receive the stress generated from the explosive pressure of the airbag.

To realize the exposure of the side connection parts 230 to the outside of the hinge unit 110, open parts 115 are formed in the hinge unit 110 at locations corresponding to the side connection parts 230, so that, when the reinforcing bracket 200 made of steel is installed in the airbag door 100, the side connection parts 230 of the reinforcing bracket 200 can be exposed outside through the open parts 115 of the hinge unit 110.

As shown in FIG. 6, it is preferred that the side connection parts 230 protrude more towards the airbag module 2 than the center connection part 240 such that, when the airbag cushion expands, the stress can primarily act on the side connection parts 230 before the stress acts on the central connection part 240.

In other words, the length of the side connection parts 230 is larger than that of the center connection part 240 so that, when the airbag cushion expands, the explosive pressure of the airbag cushion primarily reaches the side connection parts 230 exposed outside the airbag door 100.

Further, when the airbag cushion expands and the explosive pressure of the airbag cushion is applied to the airbag door 100, the airbag door 100 is pushed and rotated outwards around the hinge unit 110. In the above state, it is preferred that the rear part 215 of the reinforcing bracket 200 embedded in the airbag door 100 be prevented from rotating, and be held immobile.

Therefore, as shown in FIG. 6, to prevent the rear part 215 of the reinforcing bracket 200 from rotating when the airbag cushion expands, a support piece 231 protrudes from a surface of each side connection part 230, which faces the airbag module 2.

Further, a through hole 232 is formed through each support piece 231, so that, when the reinforcing bracket 200 is embedded in the airbag door 100 made of synthetic resin, the melt material of the airbag door 100 can flow into the through holes 232 of the support pieces 231 under pressure and thereby the support pieces 231 can be fixed to the airbag door 100. Therefore, when the airbag cushion expands, the rear part 215 of the reinforcing bracket 200 does not rotate along with the airbag door 100, but is held immobile.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door hinge structure for passenger airbags, comprising:
    an airbag module installed inside a crash pad at a location spaced apart from the crash pad; and
    an airbag door having a hinge unit provided on an inner surface of the crash pad at a location facing the airbag module;
    wherein the airbag door is provided with a reinforcing bracket, the reinforcing bracket being embedded in the airbag door at an area around the hinge unit, on which a stress is concentrated when an airbag cushion deploys from the airbag module, thus increasing a strength of the airbag door;
    wherein the reinforcing bracket includes:
        base parts arranged in opposite sides of the hinge unit with respect to a longitudinal axis of the hinge unit and connected to the airbag door;
        side connection parts connecting the base parts to each other at opposite distal ends of the base parts and arranged along a bent part of the hinge unit; and
        at least one center connection part connecting the base parts to each other between the side connection parts and arranged along the bent part of the hinge unit;
    wherein the side connection parts are exposed outside of the hinge part in a direction towards the airbag module in a way such that the stress generated when the airbag cushion deploys directly acts on the side connection parts; and
    wherein the side connection parts protrude more towards the airbag module than the at least one center connection part from the hinge part such that, when the airbag cushion deploys, the stress can act on the side connection parts before the stress acts on the at least one center connection part.

2. The door hinge structure for passenger airbags as set forth in claim 1, wherein at least one support piece protrudes from a rear surface of each of the side connection parts facing the airbag module, and wherein a rear part of the reinforcing bracket and the at least one support piece are embedded in the airbag door so as to prevent the rear part of the reinforcing bracket from being rotated when the airbag cushion deploys.

3. The door hinge structure for passenger airbags as set forth in claim 2, wherein the at least one support piece includes a through hole and a material of the airbag door is supplied into the through hole.

4. The door hinge structure for passenger airbags as set forth in claim 1, wherein the reinforcing bracket is made up of a material harder than that of the airbag door.

* * * * *